United States Patent [19]
Kawai

[11] Patent Number: 4,963,000
[45] Date of Patent: Oct. 16, 1990

[54] LENS BARREL
[75] Inventor: Tohru Kawai, Kanagawa, Japan
[73] Assignee: Canon Kabushiki Kaisha, Tokyo, Japan
[21] Appl. No.: 326,679
[22] Filed: Mar. 21, 1989
[30] Foreign Application Priority Data
Mar. 31, 1988 [JP] Japan ................................. 63-079101
[51] Int. Cl.⁵ ............................................... G02B 7/02
[52] U.S. Cl. .................................... 350/254; 350/255; 354/400
[58] Field of Search ................ 350/254, 255, 429, 430; 354/400, 195.1; 310/323

[56] References Cited
U.S. PATENT DOCUMENTS 4,560,263 12/1985 Katsuma et al. ...................... 354/400
4,660,933 4/1987 Notagashira et al. ............... 350/255
4,793,689 12/1988 Aoyagi et al. ......................... 350/255
4,806,000 2/1989 Shiokama et al. .................... 350/430
4,864,344 9/1989 Arakawa et al. ..................... 354/400

Primary Examiner—Bruce Y. Arnold
Assistant Examiner—Loha Ben
Attorney, Agent, or Firm—Fitzpatrick, Cella, Harper & Scinto

[57] ABSTRACT

A lens barrel includes a vibratory-wave motor whose stator is in frictional contact with its rotor and which has a hollow core to admit passage of a light beam, a lens group held by an axially movable lens holder, a drive mechanism for axially moving the lens holder, a rotatable manual ring, and a clutch for selecting either one of the rotor and the manual ring to transmit its rotation to the drive mechanism, the clutch having a plurality of axially movable members arranged upon movement in a direction to establish a transmission for the rotation of the rotor to the drive mechanism or upon movement to the opposite direction to establish a transmission for the rotation of the manual ring to the drive mechanism.

15 Claims, 2 Drawing Sheets

LENS BARREL

BACKGROUND OF THE INVENTION

1. Field of the Invention

This invention relates to a lens barrel in which a lens is driven by a vibratory-wave motor.

2. Description of the Related Art

Various proposals for using a vibratory-wave motor as a drive source for driving the lens have already been made (in, for example, U.S. Pat. No. 4,793,685 and U.S. Patent Application Serial No. 261,265 filed on Oct. 24, 1988; 103,303 filed on Oct. 1, 1987; U.S. Pat. No. 4,660,933, for example).

In a lens barrel of this kind, for driving the lens, if the vibratory-wave drive device using an electrostrictive element is utilized, a simplification of the structure of construction, a minimization of the size, etc. can be achieved on one hand and such a problem as follows arises on the other hand. That is, the vibratory-wave drive device has a stator in the form of a vibrator and a rotor which are pressed against each other to exert a frictional force which is made use of as the drive transmission source. In the manual mode (focusing manually), therefore, a large force is required for moving the rotor against the frictional force. In other words, the conventional lens drive device when switched to the manual mode necessitates a torque which overcomes the aforesaid frictional force. For this reason, there has been a requirement for reducing it to improve the manageability.

Therefore, many improved techniques have been proposed. For example, in U.S. Pat. No. 4,864,344 the rotation of the manual ring is electrically detected, and the amount of rotation of this ring is translated to the time for which the vibratory-wave drive device is driven.

Another method of reducing the frictional torque is to cause the vibrator in the form of a vibrating ring of the stator to vibrate in a stationary wave, which allows for reduction of the contact area of the rotary ring for the rotor with the vibration ring for the stator. However, in both methods, even in the manual mode, the electrostrictive element has to be energized. This leads to an increase in the consumption of electric power. Therefore, the camera must accommodate an electric power source of increased capacity.

Meanwhile, it has been proposed in U.S. Pat. No. 4,660,933 to make use of a simple clutch mechanism arranged so that when switching the camera to the manual mode, the vibration ring for the stator and the rotation ring for the rotor are taken out of frictional contact with each other. The use of this technique, however, makes it difficult to re-establish the constant frictional force between the stator and the rotor when the camera is switched to the automatic mode. In the vibratory wave drive device, the instability of the frictional force between the stator and the rotor gives cause for lowering the drive efficiency and for generating noise during operation.

SUMMARY OF THE INVENTION

One aspect of the invention is to provide a lens barrel in which use is made of a clutch for cutting off the operative connection between the rotor and the lens drive mechanism without causing a change of the frictional contact between the stator and the rotor, and further, this clutch is mounted on a ring member which rotates at the same speed as that of rotation of the rotor, thereby making it possible to perform manual driving of the lens, while nevertheless preserving the efficiency of the vibratory-wave motor from changing and also permitting smooth management of the actuator to be achieved.

DETAILED DESCRIPTION OF THE PREFERRED EMBODIMENT

Figure 1:
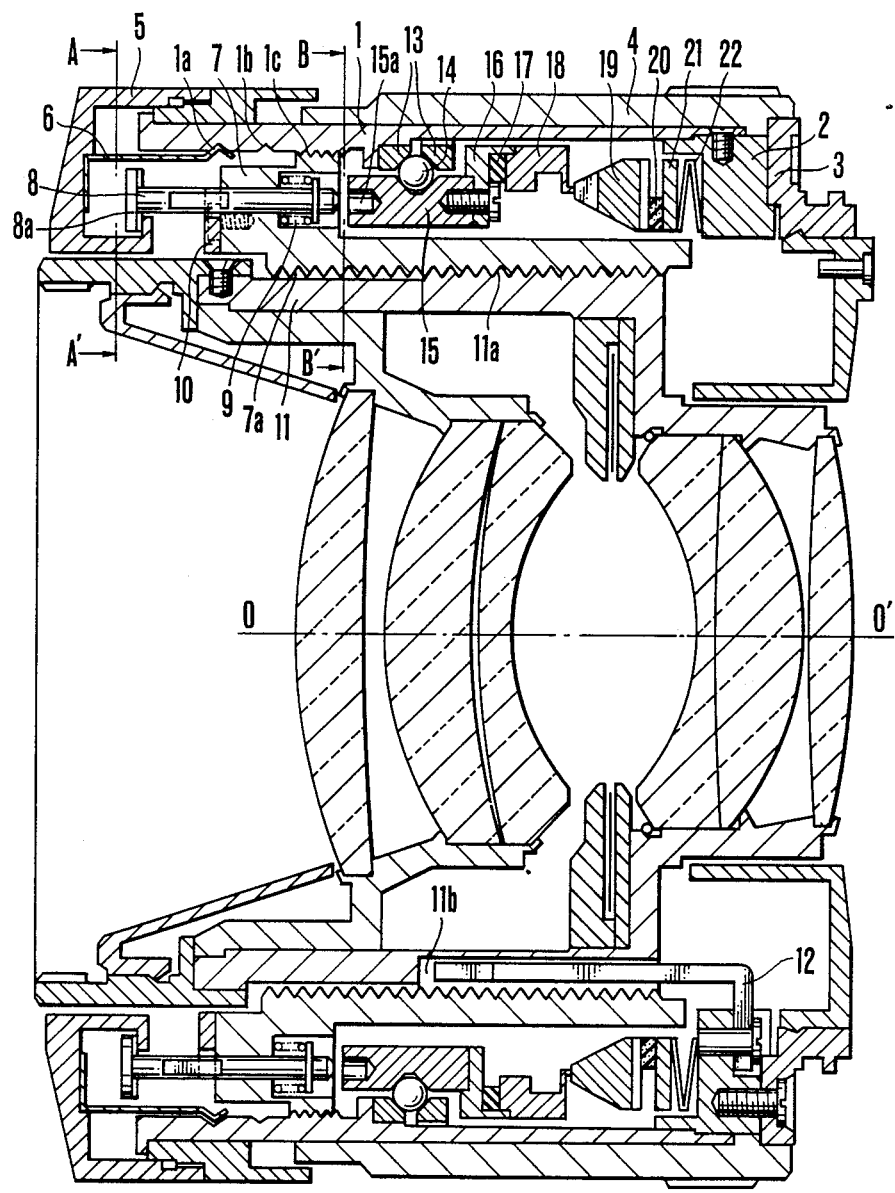
FIG. 1 is a sectional view illustrating one embodiment of a lens barrel according to the present invention.

FIG. 1 in sectional view shows an embodiment of the lens barrel according to the invention.

In FIG. 1, a lens barrel main body 1 is secured to a fixed tube 2 by a screw fastener. A bayonet mount 3 and a cover ring 4 are also secured in unified form to the fixed tube 2 by screw fasteners, or the like. A manual operating ring 5 is rotatably, axially movably fitted on the front end portion of the lens barrel main body 1. A click spring 6 extends from the inner radial wall of the ring 5 rearward. When the click spring 6 engages in a front click groove 1a or a rear click groove 1b, the manual operating ring 5 is restrained from axial movement. The inner peripheral surface of the lens barrel main body 1 has a screw-threaded portion 1c to which a rotary helicoid 7 is in helicoid connection.

A plurality of interlocking pins 8 are inserted along the axial direction into the rotary helicoid 7 in equally spaced relation over the circumferential length thereof. The interlocking pins 8 are urged normally axially rearward (to the right as viewed in the figure) by the respective compressed coil springs 9. In the manual focusing position shown in the figure, by this springing force, the head portion 8a of the interlocking pin 8 and the manual operating ring 5 are brought into pressure contact with each other.

Figure 2:
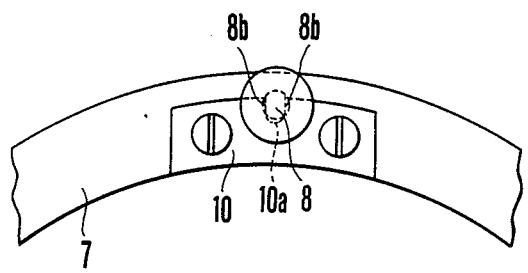
FIG. 2 is a fragmentary front view as seen from an arrow A—A' of FIG. 1.

The interlocking pin 8 has a 2-cheeked portion 8b at the center of the axial length thereof as shown in FIG. 2. This 2-cheeked portion 8b is fitted in a letter "U" shaped cutout 10a of a rotation restraining plate 10 which is fixedly secured to the rotary helicoid 7 by screw fasteners, so that the interlocking pin 8 is restrained from rotation about its own axis.

The rotary helicoid 7 has a helicoid screw 7a in the inner diameter portion and is in helicoid connection with a helicoid portion 11a of a lens holding tube 11 holding a plurality of lenses. The lens holding tube 11 has one or more key groove or grooves 11b formed in the outer peripheral end portion thereof along the axial direction. A straight key 12 whose rear end is fixedly secured to the fixed tube 2 is inserted into the key groove 11b, so that a straight axial movement of the lens holding tube 11 is assured.

Figure 4:
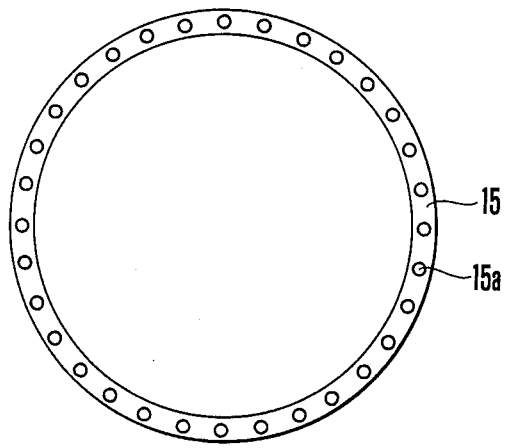
FIG. 4 is a front view as seen from an arrow B—B' of FIG. 1.

Meanwhile, an annular ball race 13 is fixedly mounted to the inner peripheral portion of the lens barrel main body 1 so as to rotatably hold a rotary ring 15 through a plurality of steel balls 14. The rotary ring 15 has a large number of holes 15a formed in the front end portion (the left end portion as viewed in the figure) thereof along the circumferential direction as shown in FIG. 4 and arranged so that the rear end portion of the interlocking pin 8 fits in one of them.

A rotor carrier 16 is fixedly secured to the rotary ring 15 by screw fasteners. A rotor 18 of the vibratory-wave motor is fitted in the rotor carrier 16 through a vibration-proof rubber 17. A stator 19 of the vibratory-wave motor is urged axially forward by a dish spring 22 whose rear end abuts on the fixed tube 2 through a felt 20 and a felt base plate 21 and is arranged so that the rotor 18 and the stator 19 are brought into pressure contact with each other by a set frictional force.

The foregoing relates to the construction and arrangement of the elements of the present embodiment. Next, the operation of the manual focusing mode is described.

When the manual operating ring 5 is rotated in the state of FIG. 1, the rotating force is transmitted through the interlocking pin 8 to the rotary helicoid 7 by the frictional engagement of the manual operating ring 5 with the head 8a of the interlocking pin 8 which is brought into pressure contact with a portion of the manual operating ring 5 by the action of the compressed coil spring 9. Incidentally, at this time, the interlocking pin 8 is non-rotated by the rotation restraining plate 10. By the rotation of the rotary helicoid 7 and the action of the straight key 12, the lens holding tube 11 is non-rotated, but is axially moved by the sum of the screw lead of the helicoid portion 11a and the helicoid portion 7a so that the focus optical system moves.

Meanwhile, to change over from this manual focus state to an operation of the auto-focus time, the user slides the manual operating ring 5 axially rearward (to the right as viewed in the figure) by as large a force as to disengage the click spring 6 from the front click groove 1a, until the click spring 6 engages in the rear click groove 1b.

Figure 3:
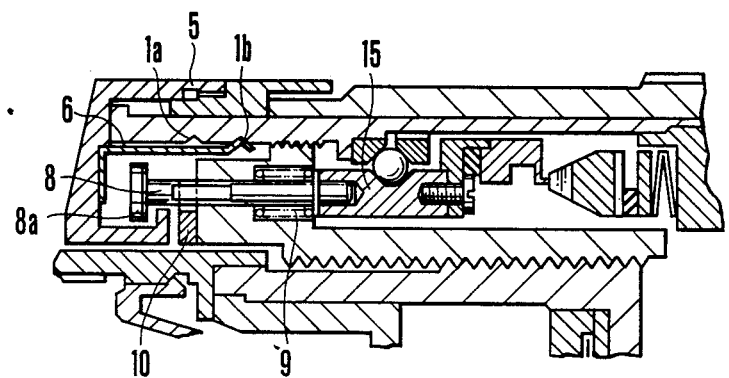
FIG. 3 is a sectional view of the main parts of the lens barrel when switched to the auto-focus mode.

FIG. 3 shows the changed-over state to the auto-focus side, wherein the manual operating ring 5 is held in restrained relation from axial movement by the click spring 6 and the rear click groove 1b of the lens barrel main body 1. Though, up to now, the interlocking pin 8 has been in pressure contact with the manual operating ring 5 by the action of the compressed coil spring 9, when the user slides the operating ring 5, the interlocking pin 8 moves axially rearward (to the right in the figure) by the force of the compressed coil spring 9 and the rear end portion of the interlocking pin 8 enters the hole 15a of the rotary ring 15. In a case where the phase angles of interlocking pin 8 and the hole 15a are not in coincidence, after the current supply to the vibratory-wave motor, the rotary ring 15 rotates in vain. When the coincidence in the phase angle position occurs, the rear end portion of the interlocking pin 8 fits in the hole 15a.

In this state, the rotary ring 15 and the rotary helicoid 7 are connected to each other by the interlocking pin 8, while the pressure contact of the manual operating ring 5 with the interlocking pin 8 is being cut off. Therefore, even if the user carelessly turns the manual operating ring 5, the optical system does not move.

That is, the member to be driven, namely, the rotary helicoid 7 is brought into operative connection with either one of the manual operating ring 5 and the rotary ring 15 fixedly mounted on the rotor 18 of the vibratory-wave motor by the axial movement of the manual operating ring 5.

Hence, according to the present embodiment, a relatively small part called the interlocking pin 8 suffices for changing over between the manual operation and the auto-focus driving. Due to this and also to the light load, the changing over goes smoothly and opportunties for damage are few.

Also, since the interlocking pin 8 is provided at a plurality of places, all the interlocking pins do not necessarily change over at once, and their change-over timings may slightly shift from each other. Therefore, the changing over is reliably performed for a high reliability.

Further, since the load torque is dispersed to a plurality of points, even a good rigidity of structure is advantageously obtained.

Due to the small size of the interlocking pin 8, the space efficiency is improved, so that the lens barrel can be minimized in bulk and size.

Also, in view of the constructional feature, the required parts are few in number, making it easy to assemble them. Thus, the production cost is inexpensive.

Further, the manual operating ring also serves as the auto-manual selector. Therefore, the changing over between the auto and manual modes can be performed quickly. It becomes possible to provide an interchangeable lens of very good manageability.

Since the clutch is located in such a position as not to decelerate the speed of rotation of the rotor, the mechanism required for a change over can be simplified in structure.

Also, since the clutch is arranged to selectively set the rotor or the manual operating ring in operative connection to the rotary helicoid which constitutes part of the drive mechanism for driving the lens, no excessive load is produced.

Though, in the illustrated embodiment, the vibratory-wave motor has been used as the drive source for focusing, modifications may be made by using the vibratory-wave motor as the drive source for zooming, or by selectively carrying out focusing and zooming by one vibratory-wave motor.

What is claimed is:

1. A lens barrel comprising:
    (a) a vibratory-wave motor mounted within said lens barrel, said vibratory-wave motor having a stator and a rotor which are in frictional contact with each other, each of said stator and said rotor having a hollow structure, a beam of light passing through hollow portions of the hollow structures;
    (b) a lens group;
    (c) a lens holding member for holding said lens group and movable along an optical axis of said lens group;
    (d) a drive mechanism for moving said lens holding member along the optical axis;
    (e) a rotary member to be rotated by said rotor, said rotary member being rotated at the same speed as that of said rotor; and
    (f) a clutch for changing over a connection and a non-connection of said rotary member with said drive mechanism, said clutch having members arranged to move into or out of a plurality of holes disposed in said rotary member, wherein when said members have moved into said holes, a rotation of said rotor is transmitted to said drive mechanism, and wherein when said members have moved out of said holes, the rotation of said rotor is not transmitted to said drive mechanism.

2. A barrel according to claim 1, wherein said rotary member is rotatably supported by a ball bearing.

3. A barrel according to claim 1, wherein said members of said clutch are shaped like a pin, and are urged by a spring member in a direction in which said pin-shaped members move into said holes.

4. A barrel according to claim 3, wherein said pin-shaped members each are supported so as not to be rotated.

5. A barrel according to claim 1, wherein said drive mechanism comprises a rotary helicoid member having a helicoid portion formed therein, and wherein said members of said clutch are supported to be movable relative to said rotary helicoid member.

6. A lens barrel comprising:
 (a) a vibratory-wave motor mounted within said lens barrel, said vibratory-wave motor having a stator and a rotor which are in frictional contact with each other, each of said stator and said rotor having a hollow structure, a beam of light passing through hollow portions of the hollow structures;
 (b) a lens group;
 (c) a lens holding member for holding said lens group and movable along an optical axis of said lens group;
 (d) a drive mechanism for moving said lens holding member along the optical axis;
 (e) a rotatably supported manual ring; and
 (f) a clutch for selectively transmitting a rotation of one of said rotor and said manual ring to said drive mechanism, said clutch having a plurality of members movable along the optical axis, wherein when said members have moved in one direction, the rotation of said rotor is transmitted to said drive mechanism, and wherein when said members have moved in another direction, the rotation of said manual ring is transmitted to said drive mechanism.

7. A barrel according to claim 6, wherein said members are shaped like a pin, and are urged in said one direction by a spring member.

8. A barrel according to claim 7, wherein said pin-shaped members each are supported so as not to be rotated.

9. A barrel according to claim 6, wherein a transmission of the rotation of said manual ring to said drive mechanism when said members have moved in said other direction is effected through the intermediary of a spring member for producing a frictional connection in the middle of the transmission.

10. A barrel according to claim 6, wherein said manual ring is supported to be movable along the optical axis, and wherein said members are moved along the optical axis in association with a movement of said manual ring along the optical axis.

11. A barrel according to claim 6, wherein said drive mechanism comprises a rotary helicoid member having a helicoid portion formed therein, and wherein said members of said clutch are supported to be movable relative to said rotary helicoid member.

12. A lens barrel comprising:
 (a) a vibratory-wave motor mounted within said lens barrel, said vibratory-wave motor having a stator and a rotor which are in frictional contact with each other, each of said stator and said rotor having a hollow structure, a beam of light passing through hollow portions of the hollow structures;
 (b) a lens group;
 (c) a lens holding member for holding said lens group and movable along an optical axis of said lens group;
 (d) a drive mechanism for moving said lens holding member along the optical axis;
 (e) a rotatably supported manual ring; and
 (f) a clutch for selectively transmitting a rotation of one of said rotor and said manual ring to said drive mechanism, said clutch being movable along the optical axis and having an interlocking mechanism disposed at a position extending from said rotor along the optical axis, wherein when said interlocking mechanism has moved in one direction, the rotation of said rotor is transmitted to said drive mechanism, and wherein when said interlocking mechanism has moved in another direction, the rotation of said manual ring is transmitted to said drive mechanism.

13. A barrel according to claim 12, wherein a transmission of the rotation of said manual ring to said drive mechanism when said interlocking mechanism has moved in said other direction is effected through the intermediary of a spring member for producing a frictional connection in the middle of the transmission.

14. A barrel according to claim 12, wherein aid manual ring is supported to be movable along the optical axis and wherein said interlocking mechanism is moved along the optical axis in association with a movement of said manual ring along the optical axis.

15. A barrel according to claim 12, wherein said drive mechanism comprises a rotary helicoid member having a helicoid portion formed therein, and wherein said interlocking mechanism of said clutch is supported to be movable relative to said rotary helicoid member.

* * * * *